Figure 1:
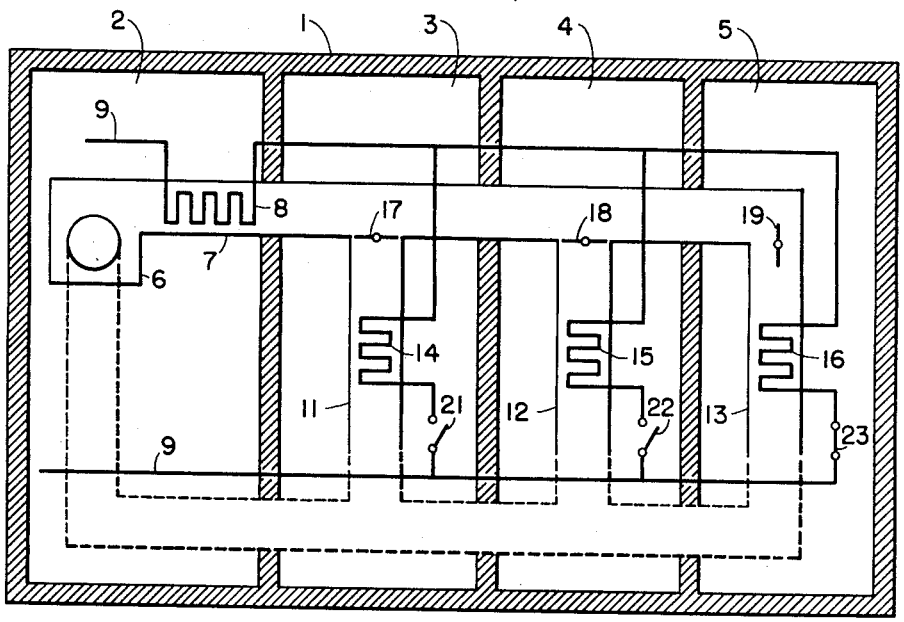
Figure 2:
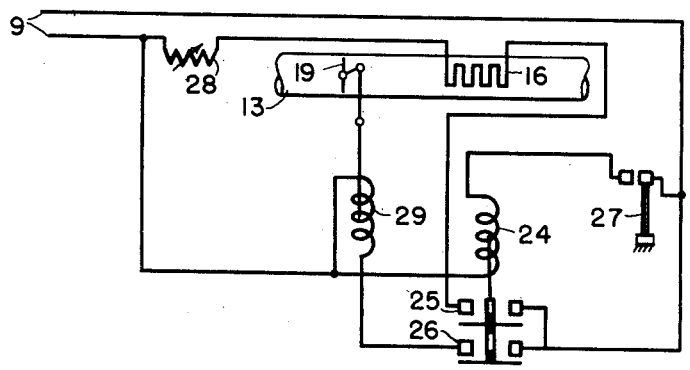

July 25, 1950        L. M. APPLEGATE        2,516,666

HEATING SYSTEM

Filed June 3, 1946

INVENTOR.

Lindsay M. Applegate

Patented July 25, 1950

2,516,666

UNITED STATES PATENT OFFICE 2,516,666

HEATING SYSTEM

Lindsay M. Applegate, Portland, Oreg.

Application June 3, 1946, Serial No. 674,098

12 Claims. (Cl. 219—39)

In heating buildings, especially in electrically heated residences, it is sometimes desirable to limit the maximum power or heat demand that can be placed on the heating system as a whole, and at the same time provide flexibility in the allocation of heat and in its distribution to the several parts of the building being heated. This invention is concerned with the control of heating under circumstances of this kind.

A principal object of this invention is the control of a heating system in which the heating load can be limited to a selected maximum demand. Another object is to provide a system in which various parts or rooms of a building can be heated lightly or heavily within the over-all imposed limitation of maximum demand. Another object is to provide an economical and flexible arrangement of heating channels for controlled multiple-unit heating, especially electrical. Still another object is to provide a system in which the greater part of the system output can be concentrated and shifted from one part or room of a building to another. Another object is to provide for the automatic readjustment of allocation of heating to various parts or rooms of a building to provide for various heating requirements within a limited maximum demand.

What constitutes this invention is described in the following specification and succinctly defined in the appended claims.

This invention is described in reference to the drawings as follows:

Figure I is a schematic diagram of the invention in general principle.

Figure II is a diagram of part of the operating mechanism omitted from Figure I for simplifying the drawing and showing also a modification of part of Figure I.

In Figure I, a subdivided structure 1 contains a plurality of rooms or spaces 2, 3, 4 and 5 which are to be heated. In one space (2 in the drawing) a heat distributing device 6 and a heat distributing channel 7 are provided. Also in this space there is a regulating device or heater referred to, if a heater, as the "central" heater 8 connected to electric conductors 9. In the other spaces, 3, 4, and 5, there are branches of the distributing channel 11, 12, and 13, with heaters referred to as "branch" heaters 14, 15, and 16. In each channel branch there are, optionally, dampers or valves 17, 18, and 19. Each branch heater is controlled by a switch 21, 22, or 23 respectively.

In Figure II part of one branch, for example 13, is shown with a heater 16 and damper 19. Switch 23 is shown in more detail as a contactor 24 with sets of contacts 25 and 26. Damper 19 is provided with an operating solenoid 29. Contactor 24 is connected for control to a thermostat 27. Regulating device or heater 8 in Figure I is represented in Figure II by a variable reactor 28.

Referring to Figure I, this system is intended to heat rooms 3, 4, and 5 in a specially regulated way. Room 2 containing the "central" part of the system is used for convenience in the drawing but room 2 is primarily space for the equipment, such as a heater room in a building. Space 2 may be heated either by a regulated portion of the total heat generated, or by normal heat losses, but for purposes of explanation it may be considered as not being heated by the system. That is, in Figure I, the "central" part of the system could be put outside the boundary 1.

The heating of rooms 3, 4, and 5 is arranged in this invention so that each room can be heated at a rate which is dependent on the over-all demand for heat in the system. To make the description more simple and direct, assume that 6 is an ordinary blower, 7 ordinary air duct and 8, 14, 15, and 16 are electric heaters of certain specified resistances. Suppose for example that the system is operated at 100 volts applied to conductors 9. Suppose also for example that the resistances of resistors 8, 14, 15 and 16 are each 5 ohms. In the condition of operation illustrated in Figure I, with switches 21 and 22 open and switch 23 closed, the total resistance of resistors 8 and 16 is 10 ohms, and the current is 10 amperes. The power dissipated in resistors 8 and 16 is 1000 watts. With blower 6 operating, dampers 17 and 18 closed, and damper 19 open, room 5 receives 1000 watts of heat.

If dampers 17, 18, and 19 are omitted, room 5 will receive 500 watts of heat developed in resistor 16 and one-third of the 500 watts developed in resistor 8, while rooms 3 and 4 will each receive one third of the heat developed in resistor 8. The distribution of the heat developed in resistor 8 can, of course, be adjusted in any proportions desired by appropriate restrictions of the sizes of conduits 11, 12, and 13, and of the settings of dampers 17, 18, and 19.

Suppose, now, that in addition to switch 23, switch 22 is also closed. Then the over-all circuit resistance will be that of resistor 8, 5 ohms, plus the resultant resistance of resistors 15 and 16 in parallel, in this case 2.5 ohms, that is, an over-all resistance of 7.5 ohms. The current will be $100/7.5 = 13.3$ amperes, approximately, and the power 1330 watts. Under these conditions the power in resistor 8 is 880 watts, and the power in each of resistors 15 and 16 is 225 watts. Now with dampers 18 and 19 open, rooms 4 and 5 will each receive 225 watts plus half of the 880 watts dissipated in resistor 8, that is, 665 watts in each room.

If, finally, all three switches 21, 22 and 23 are closed the over-all circuit resistance will be 5 ohms plus one-third of the individual resistance of 14, 15 or 16, giving in this instance an over-all resistance of 5+5/3=6.67 ohms. The current will be 15 amperes. The over-all power is 1500 watts. The power in resistor 8 is 1125 watts and in each of resistors 14, 15, and 16 is 125 watts. Now rooms 3, 4, and 5 will each receive 375+125=500 watts, if the flow of heat is uniformly divided.

In this heating arrangement, it will be seen from this illustration that it provides means for largely concentrating the heating capacity of the installation in one room if desired, and for subdividing it automatically for more rooms while restricting the maximum demand of the system. This flexibility and limitation of load could be approached in some degree by using only resistor 8 and determining the flow of heat by controlling dampers 17, 18, and 19, but the full advantages of my invention would not be realized by such a simplification. In particular in the system shown in Figure I, the diversity of demand among a group of such installations would be greater due to the variation of load than in a group of installations in which the power demand would be either zero or one predetermined value.

This system provides another degree of flexibility resulting from the optional use of different values of resistance for resistors 14, 15, and 16. For example, suppose that resistor 8 is 1.0 ohm; resistor 14, 1.0 ohm; resistor 15, 2.0 ohms; and resistor 16, 4.0 ohms. With these resistances, the power of the three resistor circuits individually operated would be: 14, 5000 watts; 15, 3333 watts; and 16, 2000 watts. With all the resistors 14, 15, and 16 connected, the total power of the system would be 6370 watts. This arrangement is applicable for example to a building in which the individual heating requirements of the rooms are materially different such as for a residence with one heater for a bathroom, one for a living room, etc. A principal advantage in such applications is the flexibility and economy of utilization of energy to fit the needs of the individual spaces to be heated. The utilization of a larger heating input to a particular room than is needed for comfort results in too frequent operation of the thermostatic controls and too abrupt changes in temperature.

In the system shown in Figure I, the selection of resistors of appropriate values, 14, 15, and 16 provide the desired rates of heating in the individual rooms, with considerable latitude in the selection of resistor 8 for load limitation. For example, if resistor 16 is 4 ohms, the power dissipated therein (circuit voltage 100) with resistor 8 of 1 ohm is 2000 watts, and with resistor 8 of 2 ohms it is 1670 watts. This is a change in the power of the individual room circuit of only 15 per cent whereas the effect on the maximum demand would be of the order of 50 per cent.

In the description of Figure I, resistor 8 has been considered to have a fixed resistance. In Figure II, the power limiting is accomplished by a reactor 28 which may be variable. Resistor 8 may, of course, be inductive or it may be of any desirable form of impedance either constant or variable. If it is of a purely reactive character the energy dissipated therein may be small enough to be negligible, in which case it will not contribute appreciably directly to the heating. Under such circumstances, it may be outside the conduit 7. The principal advantages of a resistor at 8 in comparison with a reactor is economy. A resistor of a given impedance costs less than impedance provided inductively, for example, and it accomplishes two functions: load limitation and heating. The economy of the resistor is greater than that of the reactor also because the drop in voltage across the resistor is, in phase, directly opposed to the impressed voltage, whereas that across the reactor is in quadrature with the impressed voltage. This, therefore, requires more ohms of reactance for a given installation than of resistance.

In Figure II, a typical control arrangement is shown. An electrically operated contactor or switch 24 is controlled by a thermostat 27. When the thermostat contacts close, the coil in switch 24 is energized, closing contacts 25 and 26. Contacts 25 perform, for example, the function of switch 23 in Figure I. Contacts 26, closing, energize a solenoid 29 which opens damper 19. This control arrangement would ordinarily, in a preferred arrangement, be provided for each room heated as shown in Figure I. The control arrangements shown in Figure II are illustrative primarily of the general features of control desired inasmuch as any of the variations of applicable control systems known in the art can be used.

In the interpretation and application of Figures I and II, the variation of details characteristic of heating systems in general are applicable. For example, it makes no difference in principle whether the ducts represented by the broken lines are completed or provided in effect by the air at large in the building 1. Controls may be manual or automatic or both. The ducts may be omitted in part, restricting the heating of some rooms to that provided by the individual resistor, for example, resistor 16 by the omission of duct 13. Other spaces may be provided with duct-conducted heat from resistor 8 although not heated by individual heaters. The ducts may be omitted entirely, in which case the heat produced by resistor 8 may be used to heat space 2, or by the omission of the partition between spaces 2 and 3, used jointly with heat from resistor 14 to heat the space as a whole which contains resistors 8 and 14. The several resistors 8, 14, 15, and 16 may be located at will for separate or combined heating functions while using resistor 8 both for load limiting and heating.

The principles of the system or methods of heating involved can be applied using means other than electrical. For example, in Figure I, lines 9 can represent an incoming and outgoing steam line alternatively to an electric circuit. Resistor 8 is then a steam radiator that restricts the flow of steam through itself to resistors, that is, radiators, 14, 15, and 16. Switches 21, 22, and 23 are valves controlling the flow of steam through their respective radiators. In the operation of the system using steam, the ratios of distribution of heat in the several rooms and the over-all limiting of load by resistor (or radiator) 8 are determined in principle as described for electrical operation. In all cases heat is produced, generated or liberated at controlled rates in a plurality of spaces, the total rate of heat liberation being limited by a central control element or heater which may or may not take part directly in heating the individual spaces.

I claim:

1. An electric heating system comprising a plurality of individual electric heaters associated with respective heat-receiving spaces, said heaters connected in parallel as a group in series with another heater which is in a chamber communicating with the said heat-receiving spaces, the arrangement being that, as the number of said individual heaters connected increases, the amount of energy supplied to each of said individual heaters decreases and the amount of energy dissipated in said other heater in series therewith increases, the heat produced in said chamber being distributed to said spaces and combined with the heat produced therein.

2. An electric heating system, comprising a plurality of heating ducts each associated with an individual heating resistor, a chamber associated in common with said ducts, said chamber containing a heating resistor connected in series with said individual heating resistors which are connected with individual switches in parallel, and heat transfer means, the arrangement being that the amount of heat per duct produced in said ducts decreases depending on the number of duct heaters connected, and the amount of heat produced in said chamber resistor increasing depending on the number of duct heaters connected, the heat produced by said chamber resistor being distributed among the said ducts and being combined with heat produced therein.

3. An electric heating system comprising pneumatic heat transfer means including a plurality of ducts each associated with an individual heating resistor controlled by means responsive to the temperature of a space heated by each of said ducts, and a central heating resistor common to said ducts, said resistor being connected to carry the current drawn by all the said individual heating resistors as a group in parallel, said central heating resistor being placed in said pneumatic heat transfer means so that heat generated therein is distributed to said spaces and combined with heat generated by said individual resistors.

4. An electric heating system comprising a plurality of individual heating resistors connected as a group in parallel associated with spaces to whose temperatures said individual resistors are respectively responsive, a series resistor connected to carry the current for said plurality of individual resistors, said series resistor being associated in common with said spaces whereby the amount of heat delivered to said spaces by each of said individual resistors is decreased as the number thereof connected for operation is increased, and the amount of heat produced in said series resistor and distributed to said spaces is correspondingly increased.

5. In electric heating the method which consists of establishing a plurality of individual currents in parallel, resisting each said current individually for producing heat, resisting also the sum current comprising the total of said individual currents, distributing the heat produced by said sum current and combining said heat in common with the individual amounts of heat produced by said individual currents.

6. In electric heating, means comprising a plurality of individual resistors in parallel, connected with a series resistor which carries the sum current of said individual resistors, means for dividing the heat produced in said series resistor and means for selectively distributing said divided heat with the heat produced in said individual resistors, the heat from said individual resistors being delivered to a plurality of individual spaces respectively associated therewith, and the heat from said series resistor being delivered through a space communicating in common with said individual spaces.

7. In an electric heating system the combination of a plurality of individual heating resistors in parallel each associated with an individual space to be heated, a series resistor connected to carry the entire current taken by said individual resistors, and means for dividing and selectively distributing the heat produced by said series resistor among the said spaces heated by said individual resistors, the heat from said series resistor being liberated in a space communicating in common with said individual spaces.

8. In an electric heating system the combination of a plurality of individual heating resistors in parallel each associated with a heat transmission duct, a series resistor connected to carry all the currents taken by said individual resistors, and a chamber containing said series resistor connected to a plurality of said ducts, whereby heat produced by said series resistor is divided among the said ducts and selectively combined with the heat produced by said individual resistors.

9. In an electric furnace, the combination of an enclosing structure, a plurality of air ducts, a chamber communicating in common with said air ducts, an individual heating resistor associated with each of said ducts and a series resistor in said chamber, said individual resistors being connected in parallel as a group and connected to said series resistor which carries the entire current utilized by said plurality of individual resistors and means for distributing and combining the heat from said series resistor with that produced by said individual resistors 10. In an electric heating system the combination of an enclosing structure, a plurality of air ducts, a chamber communicating in common with said ducts, an individual heating resistor associated with each of said ducts and a series resistor in said chamber, said individual resistors being connected in parallel as a group and connected to said series resistor which carries the entire current of said group of resistors and means for distributing and combining the heat from said series resistor with that produced by said individual resistors.

11. In an electric furnace the combination of a plenum chamber and a plurality of ducts connected thereto, an individual heating resistor associated with each duct and a series resistor in said plenum chamber common to all the ducts, the individual duct resistors being connected so that the current thereto is carried in common through said series resistor, thereby permitting each individual duct resistor when operated alone to receive more current than when a plurality of the duct resistors are operated simultaneously and thereby limiting the total current demand to less than the total current that would be required if the current to each duct resistor remained at the value permitted to each duct resistor when operated alone.

12. In an electric heating system the combination of a chamber and a plurality of ducts connected thereto, an individual heating resistor associated with each duct and a series resistor in said chamber common to said ducts, the individual duct resistors being connected so the current thereto is carried in common through said series resistor thereby permitting each duct resistor to receive more current when operated alone than when a plurality of the duct resistors are operated simultaneously and thereby limiting the total current demand to less than the current that would be required if the current to each duct resistor remained at the value permitted to each duct resistor when operated singly.

LINDSAY M. APPLEGATE.

REFERENCES CITED

The following references are of record in the file of this patent:

UNITED STATES PATENTS

| Number | Name | Date |
|---|---|---|
| 723,797 | Williams | Mar. 24, 1903 |
| 1,194,165 | Fry | Aug. 8, 1916 |
| 1,359,889 | Gumaer | Nov. 23, 1920 |
| 1,560,377 | Daley | Nov. 3, 1925 |
| 1,894,119 | Pratt | Jan. 10, 1933 |
| 2,015,624 | Griswold | Sept. 24, 1935 |
| 2,034,955 | Parsons | Mar. 24, 1936 |
| 2,078,675 | Lockwood | Apr. 27, 1937 |
| 2,103,560 | Smith et al. | Dec. 28, 1937 |
| 2,178,644 | Piron | Nov. 7, 1939 |
| 2,263,742 | Shivers | Nov. 25, 1941 |
| 2,279,525 | Rogers | Apr. 14, 1942 |